(12) United States Patent
Smith et al.

(10) Patent No.: US 8,398,516 B2
(45) Date of Patent: Mar. 19, 2013

(54) AVOIDING COASTING DOWNSHIFT TORQUE REVERSAL IN AN AUTOMATIC TRANSMISSION

(75) Inventors: Mark A. Smith, Canton, MI (US);
Douglas R. Cecil, Westland, MI (US);
Michael Tarrant, South Lyon, MI (US);
Vince P. LaVoie, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1142 days.

(21) Appl. No.: 11/947,251

(22) Filed: Nov. 29, 2007

(65) Prior Publication Data

US 2009/0143196 A1    Jun. 4, 2009

(51) Int. Cl.
*B60W 10/04* (2006.01)

(52) U.S. Cl. .............. 475/115; 477/70; 477/71; 701/68; 701/51

(58) Field of Classification Search .................. 475/277, 475/288; 477/115, 70, 71; 701/51, 68
See application file for complete search history.

(56) References Cited

U.S. PATENT DOCUMENTS

| | | | | |
|---|---|---|---|---|
| 5,113,721 A | * | 5/1992 | Polly | 477/80 |
| 5,758,302 A | | 5/1998 | Schulz et al. | |
| 5,951,615 A | * | 9/1999 | Malson | 477/175 |
| 6,308,125 B1 | | 10/2001 | Gleason et al. | |
| 6,368,249 B1 | | 4/2002 | Hubbard | |
| 6,385,520 B1 | | 5/2002 | Jain et al. | |
| 6,577,939 B1 | | 6/2003 | Keyse et al. | |
| 6,863,640 B2 | | 3/2005 | Kobayashi et al. | |
| 7,216,025 B2 | | 5/2007 | Keyse et al. | |

FOREIGN PATENT DOCUMENTS

WO    WO2008110936 A2    9/2008

* cited by examiner

*Primary Examiner* — David D Le
*Assistant Examiner* — Derek D Knight
(74) *Attorney, Agent, or Firm* — James Dottavio; MacMillan, Sobanski & Todd, LLC

(57) ABSTRACT

A method for controlling a coast down downshift that is produced in an automatic transmission by disengaging an off-going control element and engaging an oncoming control element, including the steps of determining a first desired pressure magnitude of the off-going control element and a first desired pressure magnitude of the oncoming control element, executing the current downshift using said first desired pressure magnitudes, determining during execution of the current downshift corrections of said first desired pressure magnitudes that occur during the current downshift, determining a second desired pressure magnitude of the off-going control element and a second desired pressure magnitude of the oncoming control element, using said corrections and the second desired pressure magnitude to determine a subsequent desired pressure magnitude of the off-going control element and a subsequent desired pressure magnitude of the oncoming control element, and executing a downshift using said subsequent desired pressure magnitudes.

2 Claims, 2 Drawing Sheets

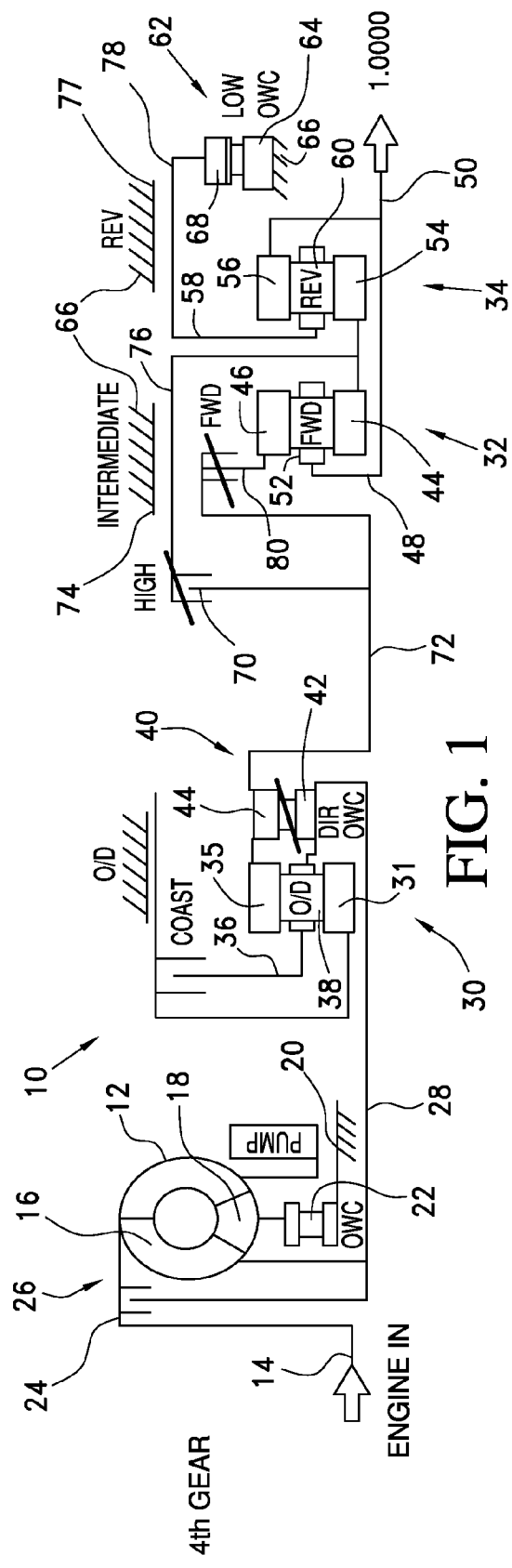
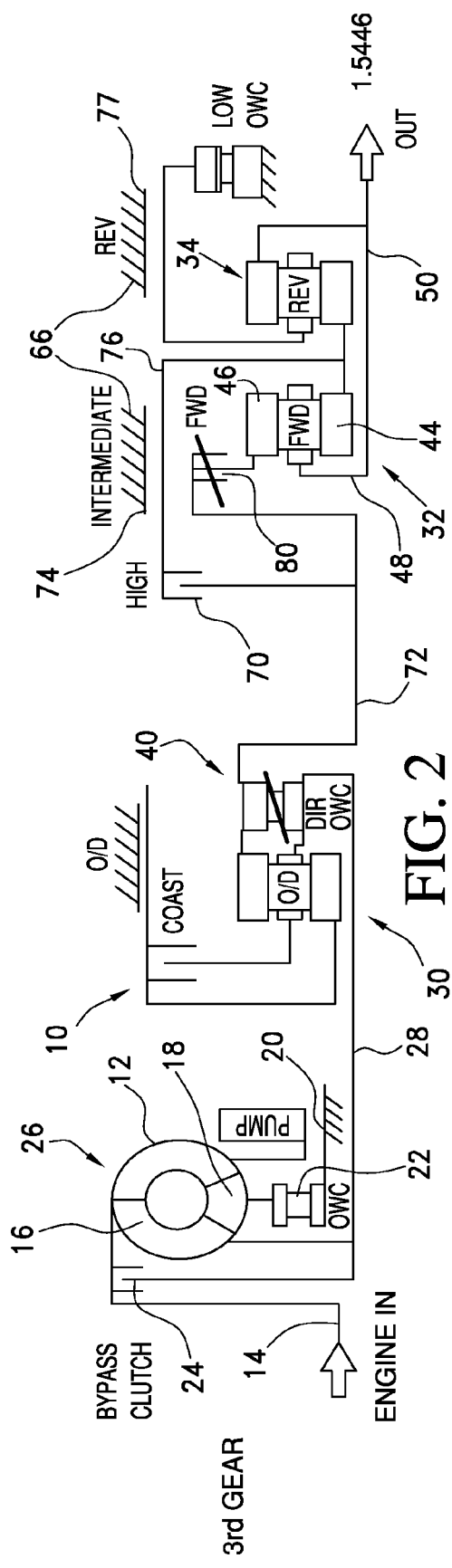

AVOIDING COASTING DOWNSHIFT TORQUE REVERSAL IN AN AUTOMATIC TRANSMISSION

BACKGROUND OF THE INVENTION

1. Field of the Invention

This invention relates generally to a multiple speed step-ratio automatic transmission for a motor vehicle and, in particular, to the control of a coasting downshift performed by the transmission.

2. Description of the Prior Art

During a coasting downshift of an automatic transmission in which shifts occur between individual gear ratios, a lash transition can occur when torque converter turbine speed and engine speed (or torque converter impeller speed) cross at too high of a rate. This lash transition excites components in the transmission and driveline system, which can result in an audible clunk disturbance to the vehicle operator and passengers. Under certain conditions, the lash can cross and cross back, and the customer may experience both an excessively long gear shift and a double clunk.

The technical reason for the clunk during the coasting downshift sequence is the rate at which the on-coming synchronous element, such as a brake comprising a band and drum, gains torque capacity relative to the off-going synchronous element losing torque capacity. The relative element capacities are determined by estimated engine torque, engine inertia, and vehicle deceleration rate, which are translated into hydraulic control pressures and apply forces acting on the elements. This translation is further impacted by a rise in the interface temperature of the on-coming band and drum, which increases the likelihood of a torque reversal and subsequent lash transition during the gear shift.

The apply force on the band is proportional to torque for both an on-coming friction control element and an off-going control element. The torque reversal causes a crossing of driveline lash, which creates a torque disturbance and the audible clunk.

A need exists in the automotive industry for a technique to adjust the relative pressures of the on-coming and off-going control elements during a coasting downshift to reduce lash and therefore minimize the rate at which that lash is crossed based on system level inputs.

SUMMARY OF THE INVENTION

A method for controlling a coast down downshift that is produced in an automatic transmission by disengaging an off-going control element and engaging an on-coming control element, including the steps of determining a first desired pressure magnitude of the off-going control element and a first desired pressure magnitude of the on-coming control element, executing the current downshift using said first desired pressure magnitudes, determining during execution of the current downshift corrections of said first desired pressure magnitudes that occur during the current downshift, determining a second desired pressure magnitude of the off-going control element and a second desired pressure magnitude of the on-coming control element, using said corrections and the second desired pressure magnitude to determine a subsequent desired pressure magnitude of the off-going control element and a subsequent desired pressure magnitude of the on-coming control element, and executing a downshift using said subsequent desired pressure magnitudes.

In order to reduce the likelihood of a torque reversal a "controlled tie-up" of the coasting synchronous downshift is produced. Due to low operating torques and pressure variability, the pressures are adapted as a function of temperature and vehicle deceleration rate. The controlled tie-up creates a controlled torque reversal rate between the off-going and on-coming friction elements during the synchronous coasting downshift.

The controlled tie-up is accomplished by raising the starting off-going element pressure to a value higher than that required based on system level inputs, thereby allowing the synchronous shift hand-off from off-going element to on-coming element to occur in a torque and pressure region where the rate of the hand-off of the shift can be managed.

The two starting servo pressure magnitudes of the on-coming element and off-going element are further adjusted until the desired hand off rate is obtained.

In addition to producing a "controlled tie-up", and in order to provide for the range of operating conditions and unit-to-unit variability, the servo pressures of the on-coming element 74 and off-going element 70 (FIG. 1) are adapted for changing conditions. To accomplish this adaptation, an algorithm of prioritized shift performance metrics determines the magnitudes of various desired corrective metrics, stores the metric values in memory, iteratively revises the stored metric values, and recalls them for use in controlling subsequent coasting downshifts.

The algorithm learns and stores in memory corrective adjustments of the synchronous pressures to avoid large levels of lash based on system level inputs.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which:

FIG. 1 is a schematic diagram showing the kinematic arrangement of an automatic transmission operating in a forward gear;

FIG. 2 is a schematic diagram showing the showing the kinematic arrangement of the transmission of FIG. 1 operating in a lower forward gear.

DESCRIPTION OF THE PREFERRED EMBODIMENT

Figure 3:
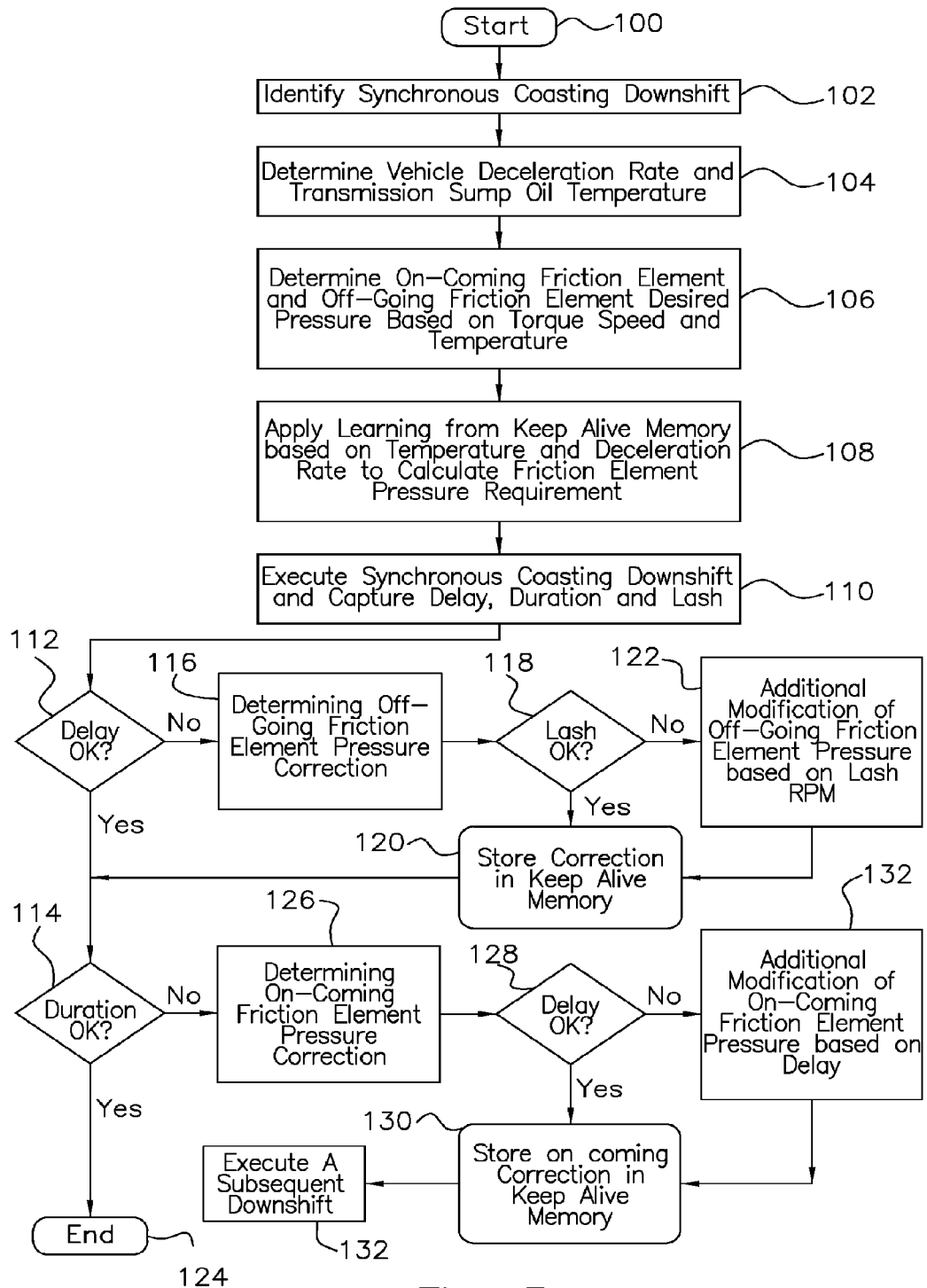
FIG. 3 is a logic flow diagram representing an algorithm for controlling successive coasting downshifts.

Referring now to the drawings, there is illustrated in FIG. 1 the kinematic arrangement of an automatic transmission 10. A torque converter includes a bladed impeller wheel 12 connected to the crankshaft 14 of an internal combustion engine, a bladed turbine wheel 16, and a bladed stator wheel 18. The impeller, stator and turbine wheels define a toroidal fluid flow circuit, whereby the impeller 12 is hydrokinetically connected to the turbine 16. The stator 18 is supported rotatably on a stationary stator sleeve shaft 20, and an overrunning brake 22 anchors the stator to the shaft 20 to prevent rotation of the stator in a direction opposite the direction of rotation of the impeller, although free-wheeling motion in the opposite direction is permitted.

The torque converter includes a bypass clutch 24 located within the torque converter 26. When clutch 24 is engaged, the turbine and impeller are mechanically connected to a transmission input shaft 28; when clutch 24 is disengaged, the turbine and impeller are hydrokinetically connected and mechanically disconnected. Fluid contained in the torque converter is supplied to the torque converter from the output of an oil pump assembly and is returned to an oil sump, to which an inlet of the pump is connected hydraulically.

A planetary gear system includes first, second, and third gear units 30, 32, 34. Gear unit 30 includes a first sun gear 31, a ring gear 35, a carrier 36 secured to input 28, and planet pinions 38 supported on carrier 36 and meshing with sun gear 32 and ring gear 34. An overrunning coupling 40 includes an inner race 42 connect to input 28 and carrier 36, an outer race 44 connected to ring gear 34, and a set of sprags for alternately driveably connecting and releasing the races 42, 44.

Gear unit 32 includes a sun gear 44, a ring gear 46, a carrier 48 secured to an output shaft 50, and planet pinions 52 supported on carrier 48 and meshing with sun gear 44 and ring gear 46.

Gear unit 34 includes a sun gear 54 secure to sun gear 44, a ring gear 56, a carrier 58 secured to output shaft 50, and planet pinions 60 supported on carrier 58 and meshing with sun gear 54 and ring gear 56. An overrunning coupling 62 includes an inner race 64 held against rotation of the transmission case 66, an outer race 68 connected to carrier 58, and a set of sprags for alternately driveably connecting and releasing the races 64, 68.

A high clutch 70, a hydraulically-actuated friction control element, alternately connects an intermediate shaft 72 to sun gears 44, 54 when clutch 70 is engaged, and releases that connection when clutch 70 is disengaged. An intermediate brake band 74, a second hydraulically-actuated friction control element, alternately connects sun gears 44, 54 and case 66 when brake band 74 frictionally engages a brake drum 76, and releases that connection when brake band 74 is disengaged. A reverse brake band 77, a third hydraulically-actuated friction control element, alternately connects carrier 58 and outer race 68 when brake band 77 frictionally engages a brake drum 78, and releases that connection when brake band 77 is disengaged. A forward high clutch 80, another hydraulically-actuated friction control element, alternately connects intermediate shaft 72 to ring gear 46 when clutch 80 is engaged, and releases that connection when clutch 80 is disengaged.

Transmission 10 operates in fourth gear when clutches 70 and 80 are engaged and the other control elements are disengaged. With the transmission so disposed, sun gears 44 and 54 are driven through clutch 80 at the speed of shaft 72, ring gear 46 is driven through clutch 70 at the speed of shaft 72, and carrier 48 and output shaft 50 rotate at the speed of intermediate shaft 72.

A coasting downshift to third gear from fourth gear occurs when high clutch 70 is disengaged synchronously with engagement of intermediate brake 74, forward clutch remains engaged, and the other friction elements remain disengaged. With the transmission so disposed, ring gear 46 is driven through clutch 80 at the speed of shaft 72, sun gear 44 is held against rotation on case 66 due to the engagement of brake 74 with brake drum 76, and carrier 48 and output shaft 50 are underdriven relative to the speed of intermediate shaft 72.

Each of control elements 70, 74, 77 and 80 are actuated to engage and disengage in response to a variable magnitude of pressure present within a hydraulic cylinder of the respective servo associated with each of the control elements. In order to reduce the likelihood of a torque reversal that could produce a clunk during a power-off or coasting downshift, a need exists for a "controlled tie-up" of the coasting synchronous downshift. Due to the low operating torque capacities of the control elements and the variability of the servo pressures, a need exists also to adapt the actuating servo pressures as a function of temperature and vehicle deceleration rate.

Delivering a "controlled tie-up" creates a controlled torque reversal rate between the off-going friction element 70 and on-coming friction element 74 during the synchronous coasting downshift. The "controlled tie-up" is accomplished by raising the starting servo pressure of off-going element 70 to a value higher than that required based on system level inputs, thereby allowing the synchronous shift to occur in a torque and pressure region where the rate of the torque transfer from the off-going element 70 to the on-coming element 74 during the downshift can be managed.

Referring to FIG. 3, the algorithm, initialized and started at step 100, identifies at step 102 that a synchronous coasting downshift of transmission 10 is required. Generally the need for the downshift is determined by a transmission controller from electronic signals representing the vehicle speed and the updated position of an accelerator pedal, i.e., the extent to which the pedal is depressed by the vehicle operator. These vehicle parameters together determine the desired gear in which the transmission should be operating according to a function stored in electronic memory, accessible to the microprocessor, and indexed by current vehicle speed and current accelerator pedal position. When these parameters indicate that a downshift is required to produce the desired gear, the algorithm detects at step 102 that the downshift is required and about to occur.

The vehicle deceleration rate and the temperature of the automatic transmission fluid (ATF) in the transmission oil sump are determined at step 104.

At step 106, a desired pressure in the servo of the on-coming friction element and a desired pressure in the servo of the off-going friction element are determined as a function of engine combustion torque, engine inertia torque, transmission oil temperature and vehicle speed.

At step 108, corrective values acquired during previous coasting downshifts between the subject gears and stored in electronic memory, preferably keep alive memory (KAM), are used to change the values determined from step 106 to produce the desired pressure in the servo of the on-coming friction element and the desired pressure in the servo of the off-going friction element for the current downshift.

At step 110, the coasting downshift is executed, and variables such as delay, duration, and lash during the current downshift are determined and stored in electronic memory.

Delay is the length of a period that begins at a reference event, such as the start of the downshift, and ends at a reference percentage of completion of the current downshift, such as five percent completion. The algorithm compares the length of delay during the current downshift to a reference range of delay. Duration is the length of a period that begins at a reference percentage of completion of the current downshift event, such five percent completion, and ends at a second reference percentage of completion of the current downshift, such as eighty-five percent completion. The algorithm compares duration of the current downshift to a reference duration.

Lash, the difference between the speed of turbine 16 and the speed of the engine crankshaft 14, is a measured parameter determined from signals representing these speeds that are produced by speed sensors. The algorithm determines the magnitude of the maximum lash that occurs after turbine speed begins to exceed engine speed and compares it to a reference lash range.

At step 112, a check is made to determine whether the current delay is within the reference delay range. If the result of step 112 is logically true, control passes to step 114. If the result of step 112 is logically false, control passes to step 116 where a correction of the off-going friction element pressure is determined from a schedule of off-going friction element pressure corrections that varies inversely with the magnitude of the current delay. For example, if the current delay is short relative to the reference range of delay, the off-going friction element pressure correction is increased and control passes to step 118. If the current delay is long relative to the reference range of delay, the off-going friction element pressure correction is decreased and control passes to step 118.

At step 118, a check is made to determine whether the current lash relative to the measured delay is within the reference lash range. If the result of step 118 is logically true, indicating that the current lash is within the lash range, control passes to step 120 where the off-going friction element pressure correction due to delay alone with acceptable lash is recorded in KAM.

If the result of step 118 is logically false, control passes to step 122 where a correction of the off-going friction element pressure, determined on the basis of delay, is further adjusted on the basis of lash. If the current magnitude of lash is high relative to the reference lash range and delay is short relative to the reference range, the off-going friction element pressure correction due to lash may be increased further. If the current magnitude of lash is high relative to the reference lash range and delay is long relative to the reference range, the off-going friction element pressure due to lash may be decreased further. If the current magnitude of lash is low relative to the reference lash range and delay is long relative to the reference range, the off-going friction element pressure due to lash may be decreased further. If the current magnitude of lash is low relative to the reference lash range and delay is short relative to the reference range, the off-going friction element pressure due to lash may be decreased further. Then control passes to step 120, where the off-going friction element pressure corrections due to delay and lash are recorded in KAM for use during execution of a subsequent coasting downshifts between the subject gears.

If the result of step 114 is logically true, indicating that duration is within the reference duration range, control passes to step 124 where no correction of the on-coming pressure element pressure is made and execution of the algorithm for the current downshift ends.

If the result of step 114 is logically false, control passes to step 126, where a correction of the on-coming friction element pressure is determined from a schedule of such pressure corrections that varies inversely with the magnitude of the current duration. For example, if the difference between the current duration and the reference duration range is zero, the on-coming friction element pressure correction may be −1.5 psi. If the difference between the current duration and the reference duration range is greater than zero, the oncoming friction element pressure correction may be −0.50 psi.

Then control passes to step 128 a check is made to determine whether the current delay is within the reference delay range. If the result of step 128 is logically true, indicating that the current delay is within the reference delay range, control passes to step 130 where the on-coming friction element pressure correction due to duration alone is recorded in KAM.

If the result of step 128 is logically false, indicating that the current delay is without the reference delay range, control passes to step 132 where a correction of the on-coming friction element pressure due to delay is determined as described with reference to step 116. Then, at step 130, the on-coming friction element pressure corrections due to duration and delay are recorded in KAM for use during execution of a subsequent coasting downshifts 132 between the subject gears.

In accordance with the provisions of the patent statutes, the preferred embodiment has been described. However, it should be noted that the alternate embodiments can be practiced otherwise than as specifically illustrated and described.

The invention claimed is:

1. A method for controlling power-off downshifts, comprising:
   executing a first transmission downshift between subject gears using a first pressure for an offgoing control element and a first pressure for an oncoming control element of the transmission
   using deviations from reference ranges of delay and lash during the first downshift to determine a correction of the offgoing control element pressure;
   using deviations from reference ranges of delay and duration during the first downshift to determine a correction of the oncoming control element pressure;
   using said corrections to update pressures for the offgoing and oncoming control elements;
   executing a second downshift between the subject gears after the first downshift using the updated pressures for the offgoing and oncoming control elements.

2. The method of claim 1, further comprising:
   using engine torque, vehicle speed and transmission oil temperature to determine the first pressures for the offgoing and oncoming control elements of the first downshift.

* * * * *